US012579787B2

(12) United States Patent
Zhang et al.

(10) Patent No.: US 12,579,787 B2
(45) Date of Patent: Mar. 17, 2026

(54) INSTRUMENT RECOGNITION METHOD BASED ON IMPROVED U² NETWORK

(71) Applicant: NANJING UNIVERSITY OF POSTS AND TELECOMMUNICATIONS, Nanjing (CN)

(72) Inventors: Dengyin Zhang, Nanjing (CN); Jingwei Li, Nanjing (CN)

( * ) Notice: Subject to any disclaimer, the term of this patent is extended or adjusted under 35 U.S.C. 154(b) by 363 days.

(21) Appl. No.: 18/469,583

(22) Filed: Sep. 19, 2023

(65) Prior Publication Data

US 2024/0005639 A1 Jan. 4, 2024

Related U.S. Application Data

(63) Continuation of application No. PCT/CN2023/103126, filed on Jun. 28, 2023.

(30) Foreign Application Priority Data

Nov. 1, 2022 (CN) .......................... 202211354710.5

(51) Int. Cl.
*G06V 10/77* (2022.01)
*G06T 3/12* (2024.01)
*G06V 10/26* (2022.01)
*G06V 10/30* (2022.01)
(Continued)

(52) U.S. Cl.
CPC ............ *G06V 10/7715* (2022.01); *G06T 3/12* (2024.01); *G06V 10/26* (2022.01); *G06V 10/30* (2022.01);
(Continued)

(58) Field of Classification Search
CPC .... G06V 10/7715; G06V 10/26; G06V 10/30; G06V 10/774; G06V 10/82; G06V 20/50;
(Continued)

(56) References Cited

U.S. PATENT DOCUMENTS 8,411,896 B2 * 4/2013 Sim ........................ G01D 4/008
382/100
12,087,154 B2 * 9/2024 Kusaka .................. G06V 10/40
(Continued)

FOREIGN PATENT DOCUMENTS

CN 110991233 A * 4/2020 ............. G06V 20/10
CN 111914623 A * 11/2020 ............. G06V 20/00

OTHER PUBLICATIONS

Deng, Guanghong, et al. "Automatic meter reading from UAV inspection photos in the substation by combining YOLOv5s and DeepLabv3+." Sensors 22.18 (2022): 7090. (Year: 2022).*
(Continued)

*Primary Examiner* — Henok Shiferaw
*Assistant Examiner* — Dion J Satcher

(57) ABSTRACT

The present invention discloses an instrument recognition method based on an improved U² network. The method includes: replacing common convolution of each layer with grouped convolution Grouped Conv on a basis of an RSU, and segmenting a dial plate and a pointer by using the network; performing noise reduction processing on the scale value array by using a mean filter; and determining a position of a scale value corresponding to the pointer by using a peak value, and outputting a reading according to the scale value and preset data. A pointer-type instrument is segmented by using the improved U² network, and automatic reading of the obtained dial plate is implemented by using a conventional computer vision method. Therefore, compared with manual reading, the method has advantages of high precision, high reliability, fast reading, low costs, and the like, and working efficiency can be greatly improved.

8 Claims, 5 Drawing Sheets

(51) Int. Cl.
    *G06V 10/774*     (2022.01)
    *G06V 10/82*     (2022.01)
    *G06V 20/50*     (2022.01)

(52) U.S. Cl.
    CPC ............ *G06V 10/774* (2022.01); *G06V 10/82* (2022.01); *G06V 20/50* (2022.01)

(58) Field of Classification Search
    CPC ............ G06V 10/273; G06V 2201/02; G06V 10/454; G06T 3/12
    USPC ........................................................ 382/157
    See application file for complete search history.

(56) References Cited

U.S. PATENT DOCUMENTS

| | | |
|---|---|---|
| 2010/0242079 A1 | 9/2010 | Riedl et al. |
| 2013/0070099 A1* | 3/2013 | Gellaboina ............ G06V 20/60 |
| | | 348/160 |
| 2016/0073149 A1 | 3/2016 | Feng et al. |
| 2019/0014360 A1 | 1/2019 | Jones et al. |

OTHER PUBLICATIONS

Qin, Xuebin, et al. "U2-Net: Going deeper with nested U-structure for salient object detection." Pattern recognition 106 (2020): 107404. (Year: 2020).*

Li, Xingxing, et al. "Analog gauge reader based on image recognition." Journal of Physics: Conference Series. vol. 1650. No. 3. IOP Publishing, 2020. (Year: 2020).*

Shen, Xin, et al. "Research on automatic indication values of pointer gauges based on computer vision." 2016 China International Conference on Electricity Distribution (CICED). IEEE, 2016. (Year: 2016).*

* cited by examiner

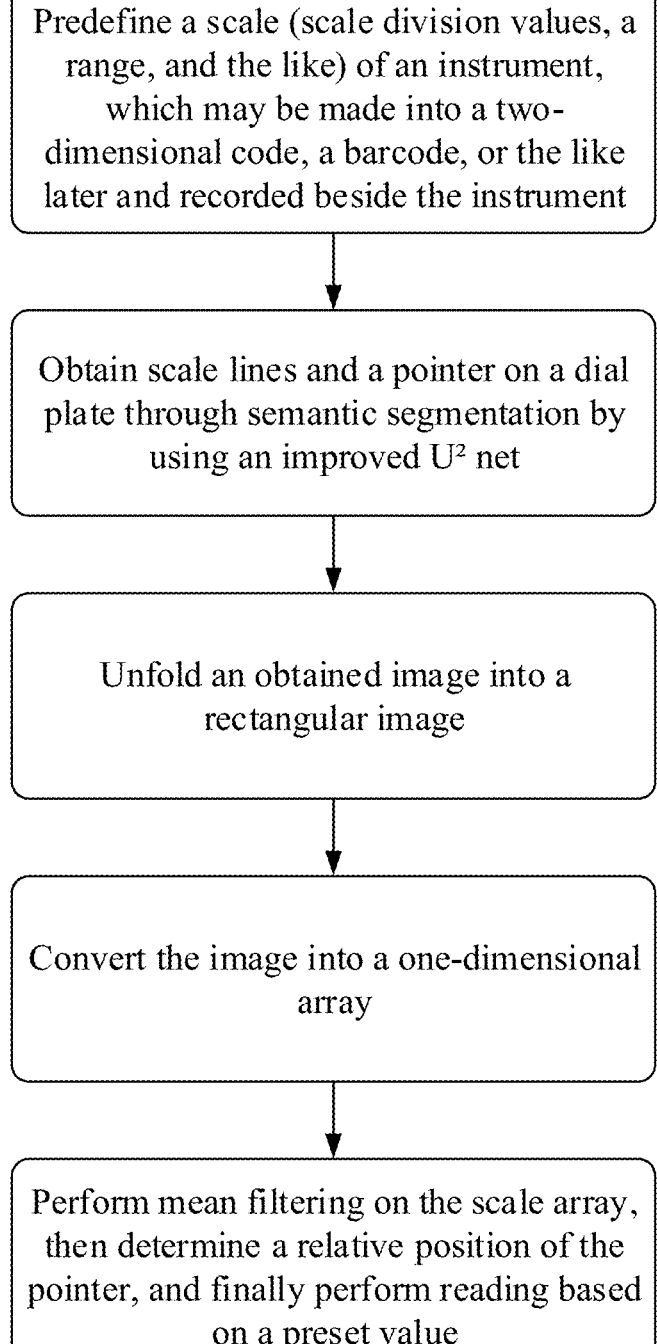

Predefine a scale (scale division values, a range, and the like) of an instrument, which may be made into a two-dimensional code, a barcode, or the like later and recorded beside the instrument Obtain scale lines and a pointer on a dial plate through semantic segmentation by using an improved $U^2$ net Unfold an obtained image into a rectangular image Convert the image into a one-dimensional array Perform mean filtering on the scale array, then determine a relative position of the pointer, and finally perform reading based on a preset value

FIG. 2

INSTRUMENT RECOGNITION METHOD BASED ON IMPROVED U² NETWORK

TECHNICAL FIELD

The present invention pertains to the technical field of image processing of computer vision, and relates to an instrument recognition method based on an improved U² network.

BACKGROUND

As an instrument frequently used in the industry, a pointer-type instrument has many advantages such as reliability, simple maintenance, and a low price. In addition, the pointer-type instrument can adapt to various scenarios, such as environments with high pressure, a high temperature, and high radiation. However, due to a harsh working environment, usually, an instrument reading operation cannot be performed manually. Therefore, automatic reading becomes a method for resolving this problem.

SUMMARY

An image segmentation technology based on deep learning has higher stability against external interference factors and implements more accurate automatic reading, thereby ensuring real-time monitoring in an industrial production process. Without requiring massive rectification of a conventional workshop, this solution can achieve objectives of saving time, saving manpower and material resources, and can further achieve a good automatic reading recognition effect.

A U²-Net is a two-layer nested U-shaped network structure. It mainly includes a residual U-shaped block (residual U-blocks, RSU) for multi-scale feature extraction and an outer U-shaped structure connected to the RSU. In a design process, this algorithm does not need to use a pre-trained backbone network for image classification, but can extract a higher-resolution feature map at a low computing cost. The RSU includes three parts: an input convolutional layer for performing channel conversion on an input, a U-shaped structure for multi-scale extraction of context information, and a residual connection layer connected to an input layer and an intermediate layer through a residual block.

Grouped Conv first appeared in AlexNet. Due to insufficient hardware development at that time, it was impossible to perform calculation in one GPU channel. Therefore, a feature map is divided and allocated to two GPUs for calculation, and then a concatenation (concatenation) operation is performed on two calculation results. Briefly, a depth $C_1$ of an input channel $H*W*C_1$ is evenly divided into g groups, that is, $$\frac{C_1}{g}$$

per group, and $C_2$ $h*w*C_1$ convolution filters are also divided into g groups, that is, each group has $$\frac{C_2}{g} \, h*w* \frac{C_1}{g}$$

convolution kernels. Each filter in each group performs a convolution operation only with 1/g of a feature map input by a previous layer, and then a concatenation operation is performed, as shown in FIG. 1. Simple calculation may be performed. For convolution without Grouped Conv, an input is $H*W*C_1$, a convolution kernel size is $C_2*h*w*C_1$, and a parameter quantity is $C_2*h*w*C_1$. For Grouped Conv, because an input feature map size is $H*W*C_1/g$, $C_2$ convolution kernels of a size $H*W*C_1/g$ are required; and because a concatenation operation does not require additional parameters, the parameter quantity is $H*W*C_1/g$, which is 1/g of an original quantity.

To achieve the foregoing objective, the present invention uses the following technical solutions.

According to a first aspect, an instrument recognition method based on an improved U² network is provided. The method includes:

> obtaining a to-be-recognized instrument image and preset data of an instrument;
>
> inputting the to-be-recognized instrument image into a trained image segmentation model based on the improved U² network, and obtaining, based on an output of the image segmentation model, a masked picture including a dial plate scale and a pointer image;
>
> unfolding the circular dial plate scale in the masked picture into a two-dimensional matrix image, and then converting the two-dimensional matrix image into a one-dimensional scale array;
>
> performing noise reduction processing on the scale array by using a mean filter, to obtain the number Point_num of dial plate scale lines passed by a pointer and the total number Nums of dial plate scale lines; and
>
> obtaining a final instrument reading through calculation based on the number Point_num of dial plate scale lines passed by the pointer and the total number Nums of dial plate scale lines, as an instrument recognition result.

In some embodiments, the unfolding the circular dial plate scale in the masked picture into a two-dimensional matrix image includes:

> $X=cx+r*\sin \theta$, and
>
> $Y=cy-r*\cos \theta$,
>
> where X and Y are coordinates after unfolding into a rectangle, cx and cy are center coordinates of a circle, r is a radius, and θ is a rotation angle corresponding to a scale line.

In some embodiments, the obtaining a final instrument reading through calculation based on the number Point_num of dial plate scale lines passed by the pointer and the total number Nums of dial plate scale lines includes:

$$Num = \frac{Point\_num}{Nums} *R,$$

> where Num represents the instrument reading, Point_num represents the number of dial plate scale lines passed by the pointer, Nums represents the total number of dial plate scale lines, and R is a range of the instrument.

In some embodiments, the image segmentation model based on the improved U² network includes a residual U-shaped block RSU for multi-scale feature extraction and an outer U-shaped structure connected to the RSU, where the RSU includes three parts: an input convolutional layer for performing channel conversion on an input, a U-shaped structure for multi-scale extraction of context information, and a residual connection layer connected to an input layer and an intermediate layer through a residual block; convolution in the residual U-shaped block RSU is grouped convolution Grouped Conv; for grouped convolution Grouped Conv, because an input feature map size is $H*W*C_1/g$, $C_2$ convolution kernels of a size $H*W*C_1/g$ are required; and because a concatenation operation does not require additional parameters, a parameter quantity is $H*W*C_1/g$, which is $1/g$ of an original quantity.

In some embodiments, a method for training the image segmentation model based on the improved $U^2$ network includes:

obtaining a labeled instrument image data set, and dividing the data set into a training set, a validation set, and a test set, where labels include the pointer, the dial plate scale, and a background; and training and testing the image segmentation model based on the improved $U^2$ network by using the data set, to obtain the trained image segmentation model based on the improved $U^2$ network.

In some embodiments, the training the image segmentation model based on the improved $U^2$ network by using the data set includes:

after performing data labeling by using labelme, converting the instrument picture in a jpg format into a picture in a single-channel png format, where 0 is the background, 1 is the pointer, and 2 is the scale; then inputting the raw picture and the corresponding png picture into the network for training; and then comparing the obtained scale and pointer with the corresponding png picture, and minimizing a difference between the scale and pointer and the png picture by continuously adjusting parameters, to obtain the trained image segmentation model based on the improved $U^2$ network.

In some embodiments, the preset data of the instrument includes scale values, scale division values, and range information of the same instrument.

According to a second aspect, the present invention provides an instrument recognition apparatus based on an improved $U^2$ network. The apparatus includes a processor and a storage medium, where the storage medium is configured to store instructions; and the processor is configured to perform operations according to the instructions to perform the steps of the method according to the first aspect.

According to a third aspect, the present invention provides a storage medium. The storage medium stores a computer program. When the computer program is executed by a processor, the steps of the method according to the first aspect are implemented.

Beneficial effects: The present invention provides an instrument recognition method based on an improved $U^2$ network, to reduce a loss of detailed features caused by downsampling and improve an effect of pointer segmentation, while reducing a quantity of parameters in the network. Common convolution of each layer is replaced with GC (Grouped Conv) on a basis of an RSU, and a dial plate and a pointer are segmented by using the network; the dial plate is unfolded into a matrix image in a conventional mathematical mode, and then a two-dimensional image is converted into a one-dimensional array; noise reduction processing is performed on the scale value array by using a mean filter; and a position of a scale value corresponding to the pointer is determined by using a peak value, and a reading is output according to the scale value and preset data. In the present invention, a pointer-type instrument is segmented by using the improved $U^2$ network, and automatic reading of the obtained dial plate is implemented by using a conventional computer vision method. The pointer-type instrument has a simple structure, and is easy to mount and insensitive to industrial factors such as electromagnetic interference. Therefore, compared with manual reading, the method has advantages of high precision, high reliability, fast reading, low costs, and the like, and working efficiency can be greatly improved. The scale and pointer in the pointer-type instrument image are obtained by using an image segmentation technology, and then a final reading is obtained through calculation based on preset dial plate information. In this way, unmanned real-time online reading is implemented, working efficiency is improved, and human resources and material resources are saved.

BRIEF DESCRIPTION OF DRAWINGS

FIG. 2 is a flowchart of a method according to an embodiment of the present invention;

DESCRIPTION OF EMBODIMENTS

Figure 1:
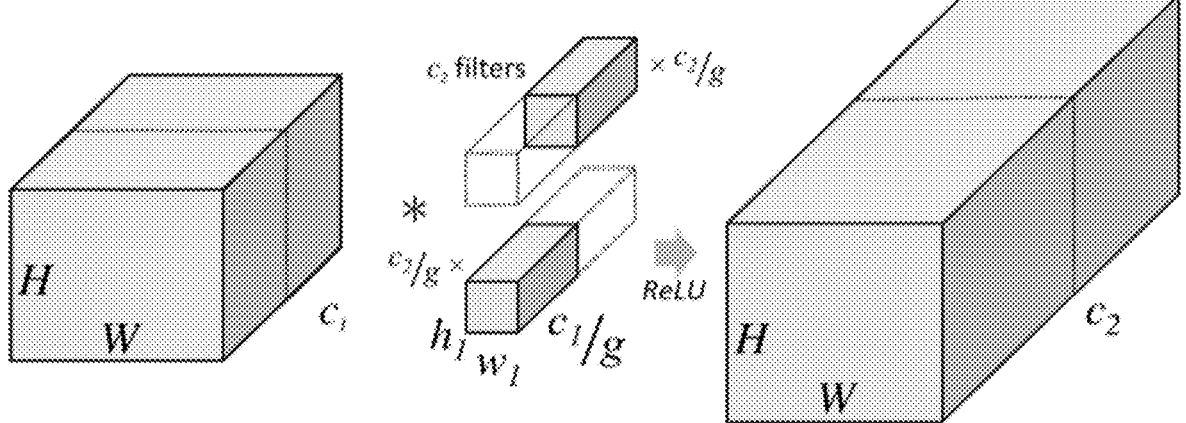
FIG. 1 is a schematic diagram of a Grouped Conv operation according to an embodiment of the present invention.

The present invention is hereinafter further described in detail with reference to accompanying drawing and specific embodiments.

The following embodiments are merely used to describe the technical solutions of the present invention more clearly, but the protection scope of the present invention is not limited thereto.

In the description of the present invention, the term "several" means more than one, the term "a plurality of" means more than two, the terms "greater than", "less than", "exceeding", and the like are understood as exclusive of a specified number, and the terms "above", "below", "within", and the like are understood as inclusive of a specified number. The terms "first" and "second", if described, are only intended to distinguish between technical features, and cannot be understood as indicating or implying relative importance or implicitly indicating a quantity of indicated technical features or implicitly indicating an order of indicated technical features.

In the description of the present invention, a description referring to the terms "an embodiment", "some embodiments", "exemplary embodiments", "an example", "a specific example", or "some examples" means that a specific feature, structure, material or characteristic described with reference to the embodiment or example is included in at least one embodiment or example of the present invention. In this specification, illustrative expressions of these terms do not necessarily refer to the same embodiment or example. Moreover, the specific feature, structure, material, or characteristic described may be combined in any suitable manner in any one or more embodiments or examples.

Embodiment 1

An instrument recognition method based on an improved $U^2$ network includes:

obtaining a to-be-recognized instrument image and preset data of an instrument;

inputting the to-be-recognized instrument image into a trained image segmentation model based on the improved $U^2$ network, and obtaining, based on an output of the image segmentation model, a masked picture including a dial plate scale and a pointer image;

unfolding the circular dial plate scale in the masked picture into a two-dimensional matrix image, and then converting the two-dimensional matrix image into a one-dimensional scale array;

performing noise reduction processing on the scale array by using a mean filter, to obtain the number Point_num of dial plate scale lines passed by a pointer and the total number Nums of dial plate scale lines; and obtaining a final instrument reading through calculation based on the number Point_num of dial plate scale lines passed by the pointer and the total number Nums of dial plate scale lines, as an instrument recognition result.

In some embodiments, the unfolding the circular dial plate scale in the masked picture into a two-dimensional matrix image includes:

$$X = cx + r^* \sin \theta, \text{ and}$$

$$Y = cy - r^* \cos \theta,$$

where X and Y are coordinates after unfolding into a rectangle, cx and cy are center coordinates of a circle, r is a radius, and $\theta$ is a rotation angle corresponding to a scale line.

In some embodiments, the obtaining a final instrument reading through calculation based on the number Point_num of dial plate scale lines passed by the pointer and the total number Nums of dial plate scale lines includes:

$$Num = \frac{Point\_num}{Nums} * R,$$

where Num represents the instrument reading, Point_num represents the number of dial plate scale lines passed by the pointer, Nums represents the total number of dial plate scale lines, and R is a range of the instrument.

In some embodiments, the image segmentation model based on the improved $U^2$ network includes a residual U-shaped block RSU for multi-scale feature extraction and an outer U-shaped structure connected to the RSU, where the RSU includes three parts: an input convolutional layer for performing channel conversion on an input, a U-shaped structure for multi-scale extraction of context information, and a residual connection layer connected to an input layer and an intermediate layer through a residual block; convolution in the residual U-shaped block RSU is grouped convolution Grouped Conv; for grouped convolution Grouped Conv, because an input feature map size is $H^*W^*C_1/g$, $C_2$ convolution kernels of a size $H^*W^*C_1/g$ are required; and because a concatenation operation does not require additional parameters, a parameter quantity is $H^*W^*C_1/g$, which is 1/g of an original quantity.

In some embodiments, a method for training the image segmentation model based on the improved $U^2$ network includes:

obtaining a labeled instrument image data set, and dividing the data set into a training set, a validation set, and a test set, where labels include the pointer, the dial plate scale, and a background; and training and testing the image segmentation model based on the improved $U^2$ network by using the data set, to obtain the trained image segmentation model based on the improved $U^2$ network.

In some embodiments, the training the image segmentation model based on the improved $U^2$ network by using the data set includes:

after performing data labeling by using labelme, converting the instrument picture in a jpg format into a picture in a single-channel png format, where 0 is the background, 1 is the pointer, and 2 is the scale; then inputting the raw picture and the corresponding png picture into the network for training; and then comparing the obtained scale and pointer with the corresponding png picture, and minimizing a difference between the scale and pointer and the png picture by continuously adjusting parameters, to obtain the trained image segmentation model based on the improved $U^2$ network.

In some embodiments, the preset data of the instrument includes scale values, scale division values, and range information of the same instrument.

As shown in FIG. 2, an instrument recognition method based on an improved $U^2$ network includes the following steps.

Figure 4:
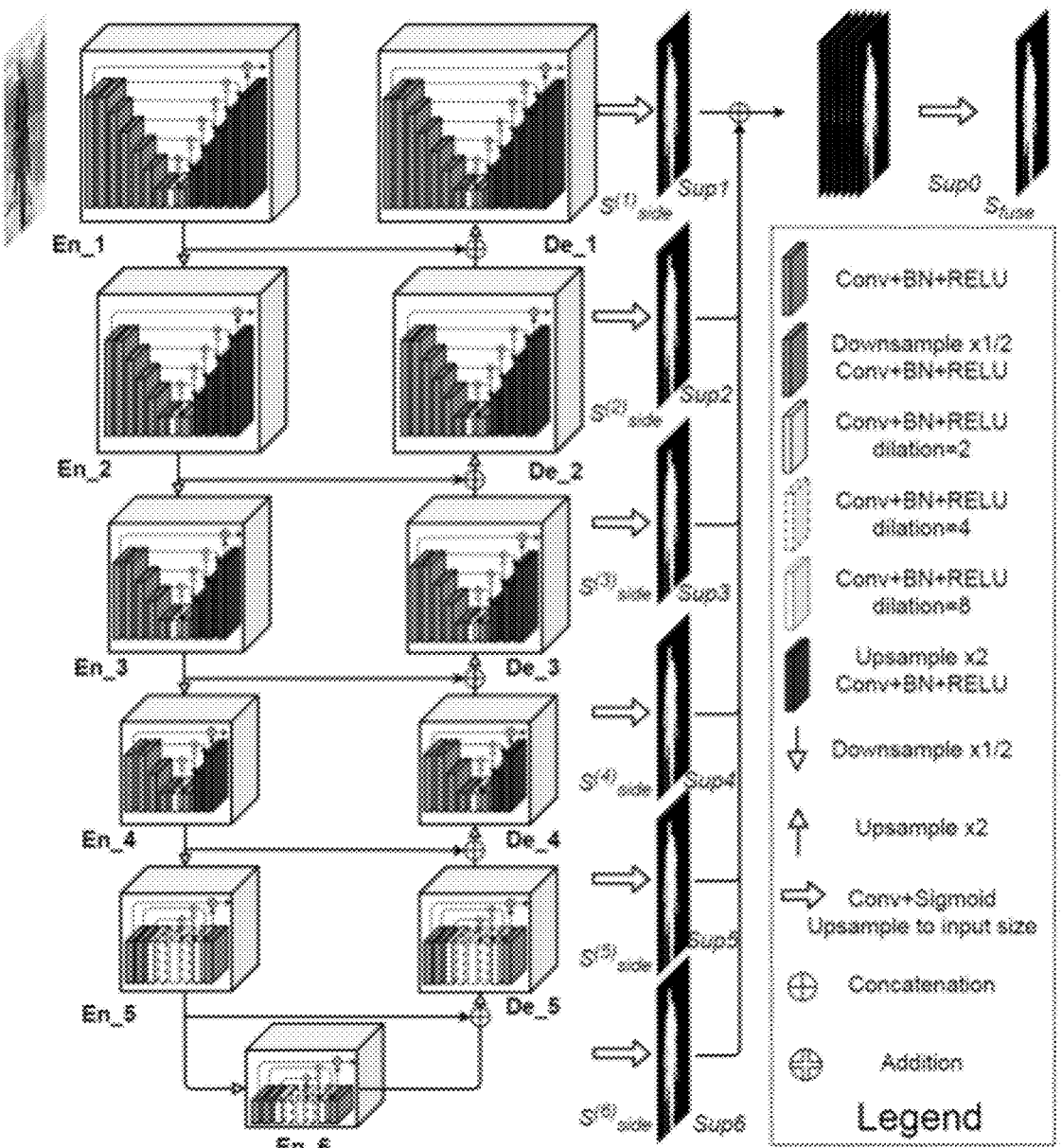
FIG. 4 is a structural diagram of a $U^2$-Net segmentation network.
Figure 5:
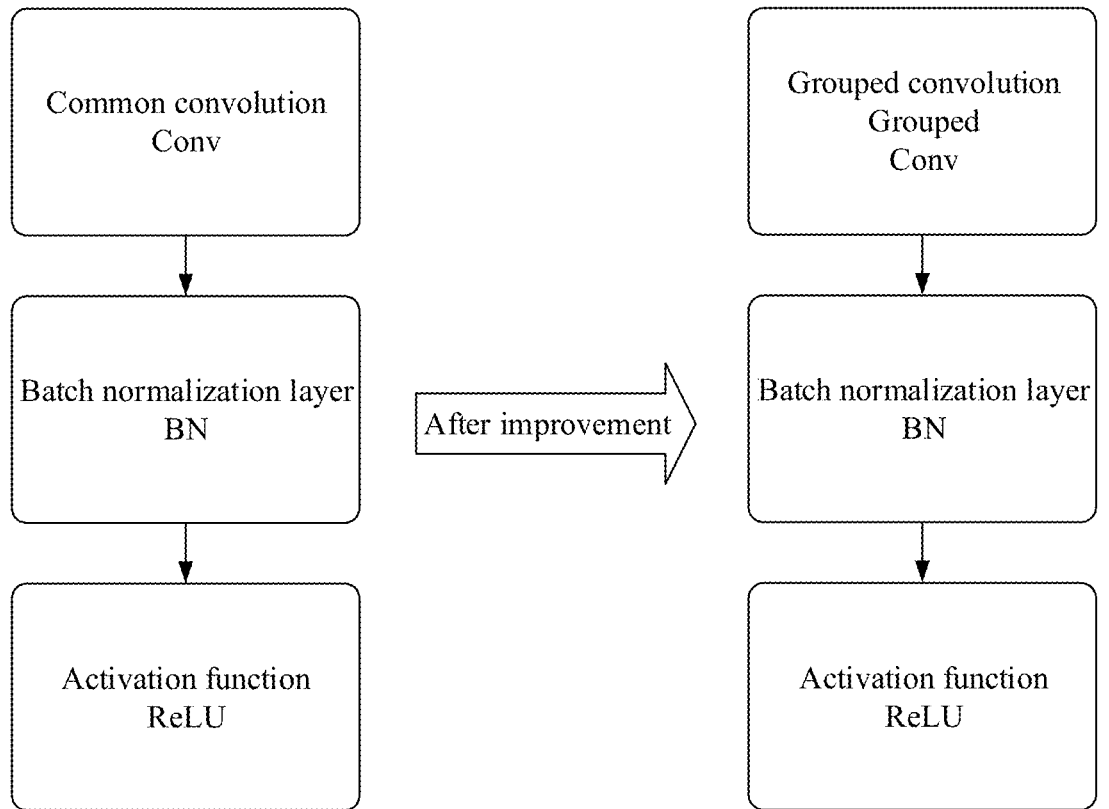
FIG. 5 is an improved RSU module.

Step 1: Obtain an image data set of a same pointer-type instrument through real photographing, divide this data set into a training set, a validation set, and a test set based on a ratio of 6:2:2, record fixed information such as scale values, scale division values, and a range of this instrument as preset data, and input the data into an improved $U^2$-Net segmentation network (as shown in FIG. 4) as fixed hyperparameters, to obtain a final instrument reading through calculation based on a formula (1) after obtaining a ratio of a reading of a pointer to a reading of an entire dial plate:

$$Num = \frac{Point\_num}{Nums} * R \tag{1}$$

where Num represents the instrument reading, Point_num represents the number of dial plate scale lines passed by the pointer, Nums represents the total number of dial plate scale lines, and R is a range of the instrument.

Figure 3:
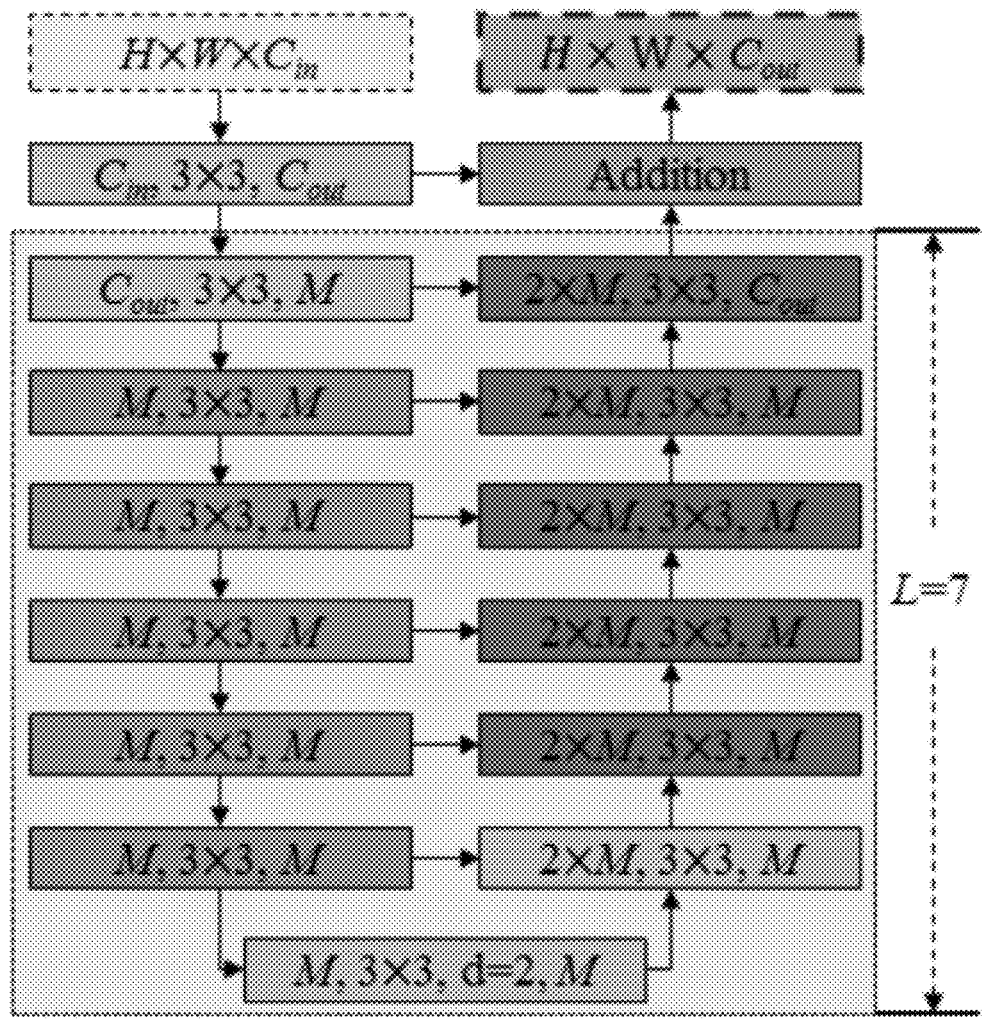
FIG. 3 is an RSU module provided in a $U^2$-Net segmentation network.

Step 2: Obtain the pointer and scale by using the improved $U^2$-Net segmentation network, where a $U^2$-Net provides a unique RSU module (as shown in FIG. 3) based on an encoding-decoding mode of a U-Net network structure, and this module can extract more different receptive field information from a context without increasing overheads, thereby greatly improving accuracy of segmentation, reducing segmentation time, and implementing a real-time reading function. On a basis of the RSU, common convolution of each layer is replaced with grouped convolution GC (Grouped Conv) shown in FIG. 1. In this way, an objective of reducing a parameter quantity is achieved, and inference is completed more quickly.

Step 3: Perform coordinate transformation to transform a circular dial plate scale obtained by using the $U^2$-Net network, and obtain a point in a corresponding position of a rectangle based on r and θ by using a formula (2):

$$X=cx+r*\sin\theta, \text{ and}$$

$$Y=cy-r*\cos\theta \quad (2)$$

where X and Y are coordinates after unfolding into the rectangle, cx and cy are center coordinates of a circle, r is a radius, and θ is a rotation angle corresponding to a scale line.

Step 4: Perform noise reduction processing on the scale array by using a mean filter, where the mean filter is a linear filter for calculating an average value of pixels in a region of a window and then setting the average value obtained through calculation in the window as a pixel value of a current anchor point. The mean filter is implemented by using convolution, and the obtained pixel value needs to be divided by a size of the window. The mean filter is easy to operate, has high efficiency, and is capable of properly reducing noise in a single segmented image such as the pointer and scale. Therefore, a position of the pointer relative to a scale line is determined more properly. Finally, the reading is performed based on the preset data.

In step 1, the preset data, such as the range of the dial plate, the scale division values, and other information, is input into the improved $U^2$-Net network as hyperparameters, so that the reading is obtained by calculating a ratio of scale lines passed by the pointer after a scale line corresponding to the pointer is obtained.

In step 2, a specific segmentation operation is: after performing data labeling by using labelme, converting an instrument picture in a jpg format into a picture in a single-channel png format, where 0 is a background, 1 is the pointer, and 2 is the scale; then inputting the raw picture and the corresponding png picture into the network for training; and then comparing the obtained scale and pointer with the corresponding png picture, and minimizing a difference between the scale and pointer and the png picture by continuously adjusting parameters.

In step 3, scanning is performed by using an image center as an origin and using a width, to unfold the scale and pointer of the instrument dial plate into a rectangular image. Then two images are vertically superimposed and converted into a one-dimensional array, which is drawn as a line graph.

In step 4, noise reduction processing is performed on the obtained image by using the mean filter, to facilitate clearer reading later. Then by locating each peak point, the number of scale lines of the dial plate and positions of the scale lines may be obtained, and a relative position of the pointer on the dial plate may be determined. Then a percentage value of the dial plate may be obtained through calculation based on the preset data.

The method should be based on a camera. In addition, the reading can be displayed in real time at a back end. For example, in a chemical plant, a fixed antenna needs to be mounted at a place with dense instruments. Then an obtained picture is transmitted to a program. A scale and a pointer are first segmented by using an improved $U^2$-Net network, and saved as a picture in a png format. Then a circular scale image is converted into a rectangular image through coordinate transformation. Then noise reduction processing is performed on the picture by using a mean filter, to improve recognition accuracy. Finally, a ratio of scale lines passed by the pointer to all scale lines is obtained and then multiplied by a range, so that a final reading is obtained.

Embodiment 2

According to a second aspect, this embodiment provides an instrument recognition apparatus based on an improved $U^2$ network. The apparatus includes a processor and a storage medium, where the storage medium is configured to store instructions; and the processor is configured to perform operations according to the instructions to perform the steps of the method according to Embodiment 1.

Embodiment 3

According to a third aspect, this embodiment provides a storage medium. The storage medium stores a computer program. When the computer program is executed by a processor, the steps of the method according to Embodiment 1 are implemented.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage medium (including but not limited to a disk memory, a CD-ROM, an optical memory, and the like) that include computer-usable program code.

This application is described with reference to the flowcharts and/or the block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

Alternatively, these computer program instructions may be stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

The foregoing descriptions are merely preferred implementations of the present invention. It should be noted that a person of ordinary skill in the art may further make several improvements and refinements without departing from the principle of the present invention, and the improvements and refinements shall also be construed as falling within the protection scope of the present invention.

What is claimed is:

1. An instrument recognition method based on an improved $U^2$ network, comprising the following steps:

obtaining a to-be-recognized instrument image and preset data of an instrument;

inputting the to-be-recognized instrument image into a trained image segmentation model based on the improved $U^2$ network, and obtaining, based on an output of the image segmentation model, a masked picture comprising a dial plate scale and a pointer image;

unfolding the circular dial plate scale in the masked picture into a two-dimensional matrix image, and then converting the two-dimensional matrix image into a one-dimensional scale array;

performing noise reduction processing on the scale array by using a mean filter, to obtain the number Point_num of dial plate scale lines passed by a pointer and the total number Nums of dial plate scale lines; and obtaining a final instrument reading through calculation based on the number Point_num of dial plate scale lines passed by the pointer and the total number Nums of dial plate scale lines, as an instrument recognition result;

wherein the unfolding the circular dial plate scale in the masked picture into a two-dimensional matrix image comprises:

$$X=cx+r*\sin\theta, \text{ and}$$

$$Y=cy-r*\cos\theta,$$

wherein X and Y are coordinates after unfolding into a rectangle, cx and cy are center coordinates of a circle, r is a radius, and $\theta$ is a rotation angle corresponding to a scale line.

2. The instrument recognition method based on an improved $U^2$ network according to claim 1, wherein the obtaining the final instrument reading through calculation based on the number Point_num of dial plate scale lines passed by the pointer and the total number Nums of dial plate scale lines comprises:

$$Num = \frac{Point\_num}{Nums} * R,$$

wherein Num represents the instrument reading, Point_num represents the number of dial plate scale lines passed by the pointer, Nums represents the total number of dial plate scale lines, and R is a range of the instrument.

3. The instrument recognition method based on an improved $U^2$ network according to claim 1, wherein the image segmentation model based on the improved $U^2$ network comprises a residual U-shaped block RSU for multi-scale feature extraction and an outer U-shaped structure connected to the RSU, wherein the RSU comprises three parts: an input convolutional layer for performing channel conversion on an input, a U-shaped structure for multi-scale extraction of context information, and a residual connection layer connected to an input layer and an intermediate layer through a residual block; convolution in the residual U-shaped block RSU is grouped convolution Grouped Conv; for grouped convolution Grouped Conv, because an input feature map size is $H*W*C_1/g$, $C_2$ convolution kernels of a size $H*W*C_1/g$ are required; and because a concatenation operation does not require additional parameters, a parameter quantity is $H*W*C_1/g$, which is 1/g of an original quantity.

4. The instrument recognition method based on an improved $U^2$ network according to claim 1, wherein a method for training the image segmentation model based on the improved $U^2$ network comprises:

obtaining a labeled instrument image data set, and dividing the data set into a training set, a validation set, and a test set, wherein labels comprise the pointer, the dial plate scale, and a background; and training and testing the image segmentation model based on the improved $U^2$ network by using the data set, to obtain the trained image segmentation model based on the improved $U^2$ network.

5. The instrument recognition method based on an improved $U^2$ network according to claim 4, wherein the training the image segmentation model based on the improved $U^2$ network by using the data set comprises:

after performing data labeling by using labelme, converting the instrument picture in a jpg format into a picture in a single-channel png format, wherein 0 is the background, 1 is the pointer, and 2 is the scale; then inputting the raw picture and the corresponding png picture into the network for training; and then comparing the obtained scale and pointer with the corresponding png picture, and minimizing a difference between the scale and pointer and the png picture by continuously adjusting parameters, to obtain the trained image segmentation model based on the improved $U^2$ network.

6. The instrument recognition method based on an improved $U^2$ network according to claim 1, wherein the preset data of the instrument comprises scale values, scale division values, and range information of the same instrument.

7. An instrument recognition apparatus based on an improved $U^2$ network, comprising a processor and a storage medium, wherein the storage medium is configured to store instructions; and the processor is configured to perform operations according to the instructions to perform the steps of the method according to claim 1.

8. A non-transitory storage medium, wherein the storage medium stores a computer program, and when the computer program is executed by a processor, the steps of the method according to claim 1 are implemented.

* * * * *